United States Patent [19]
Dickey

[11] 3,879,247
[45] *Apr. 22, 1975

[54] METHOD OF HEAT SEALING AND HOLDING PACKAGE CLOSURE ELEMENTS

[75] Inventor: John W. Dickey, Standardsville, Va.

[73] Assignee: Harrington-Research Corporation, Cincinnati, Ohio

[*] Notice: The portion of the term of this patent subsequent to May 1, 1990, has been disclaimed.

[22] Filed: Apr. 2, 1973

[21] Appl. No.: 346,764

Related U.S. Application Data

[63] Continuation-in-part of Ser. No. 164,496, July 20, 1971, Pat. No. 3,730,804, which is a continuation of Ser. No. 754,029, Aug. 20, 1968, abandoned.

[52] U.S. Cl. .................... 156/272; 156/273; 53/39
[51] Int. Cl. .................... B29c 27/04; B65b 7/00
[58] Field of Search .................... 156/272–274, 156/380; 219/10.53; 53/39

[56] References Cited
UNITED STATES PATENTS

| | | | |
|---|---|---|---|
| 2,976,907 | 3/1961 | Harvey et al. | 285/382.2 |
| 3,475,243 | 10/1969 | Scalora | 156/380 |
| 3,730,804 | 5/1973 | Dickey | 156/272 |

*Primary Examiner*—Charles E. Van Horn
*Assistant Examiner*—M. G. Wityshyn
*Attorney, Agent, or Firm*—Harold L. Stowell

[57] ABSTRACT

A method of heat-sealing packages is provided wherein elements thereof to be sealed are heated and held by the combined heating and holding action of magnetic susceptible particles subjected to alternating current and to such method wherein a heat softenable sealing material comprises a thermoplastic adhesive added to the elements of the package to be sealed, or the softenable material may comprise the packaging per se.

6 Claims, 15 Drawing Figures

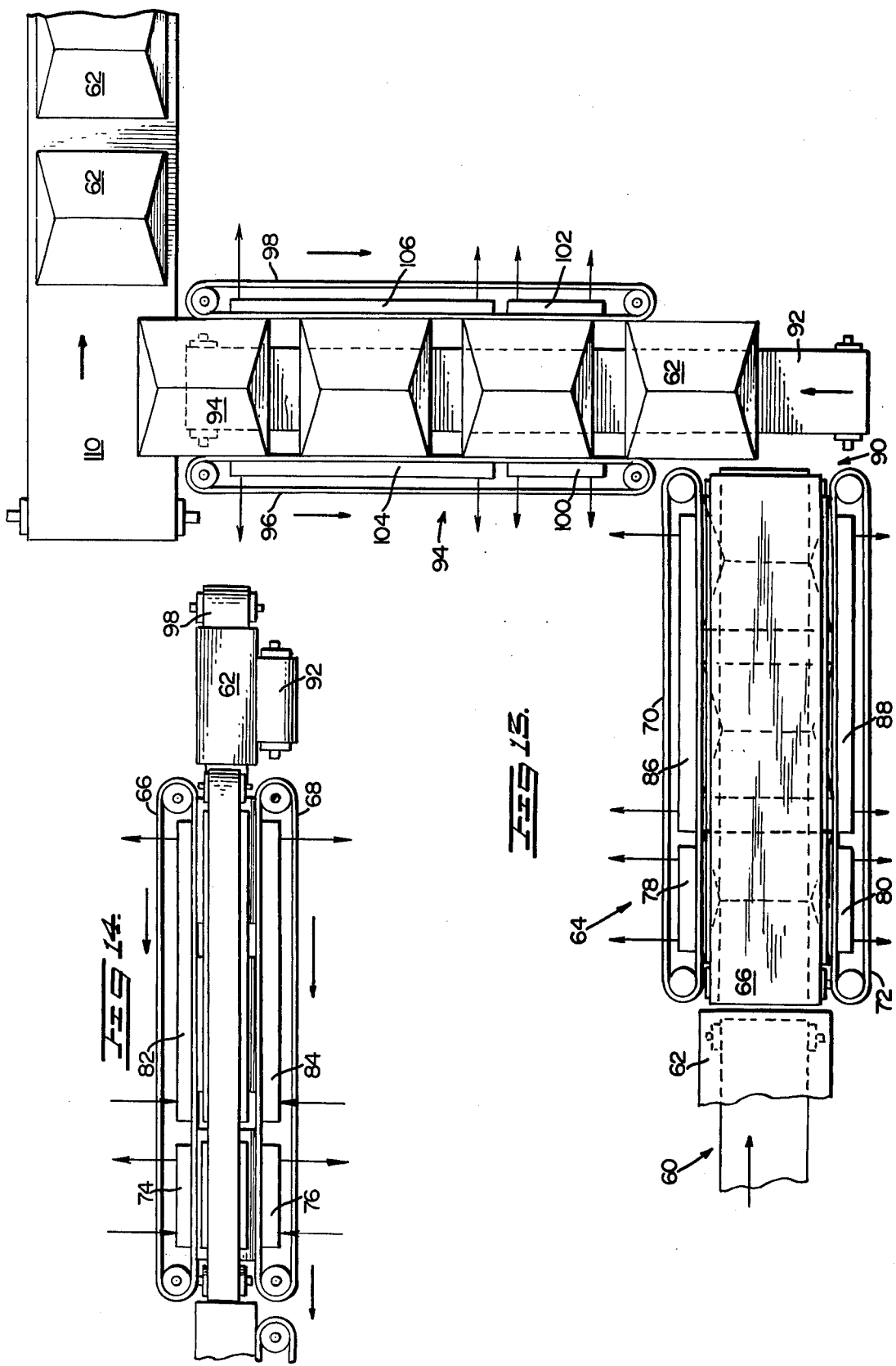

METHOD OF HEAT SEALING AND HOLDING PACKAGE CLOSURE ELEMENTS

This application is a continuation-in-part of my copending application Ser. No. 164,496, (now U.S. Pat. No. 3,730,804) filed July 20, 1971, which is a continuation of my application Ser. No. 754,029, filed Aug. 20, 1968, now abandoned.

BACKGROUND

The closing and sealing of packages such as pasteboard cartons and containers and soft containers such as plastic bags have presented substantial problems in the industry. For example, where pasteboard and the like cartons, having plural flaps, are to be closed and sealed, particular difficulty is encountered when the contents of the carton are frangible or compressible, or the contents do not completely fill the carton and external pressure on the flaps merely causes the flaps to be sealed to be moved inwardly. Further, where the container or package comprises a flexible bag or the like constructed of heat softenable or heat sealable compositions or wherein opposed surfaces of such flexible bags are coated with a heat softenable, for example, thermoplastic resinous or resinous and wax material, difficulties are experienced in applying sufficient heat to provide a proper seal without overheating and rupturing and ruining the container and, at the same time, applying inwardly directed pressure to the zones to be sealed to insure intimate contact with the heat softenable material and a surface to be engaged therewith.

While prior art devices have been devised which will carry out such sealing steps, the apparatus has been very complicated and expensive; and rather slow in operation, therefore, particularly unsuited for high-speed packaging methods.

In my hereinbefore referred to application, there is disclosed a method of heat sealing a pair of closure elements of a package wherein at least one of said elements of the pair includes a heat softenable material and at least one of said elements of the pair includes magnetic susceptible material comprising simultaneously heating said pair of elements to soften the heat softenable material and holding said pair of elements under internal pressure therebetween by subjecting said elements to a high frequency alternating and steady magnetic fields.

THE INVENTION

It has now been found that the method disclosed and claimed in my said prior applications can be carried out using only alternating current.

It is, therefore, a principal object of the present invention to provide a method for sealing rigid or pliable packages and containers by the combined heating and holding properties induced in magnetic susceptible particles by the application of alternating current to the magnetic susceptible particles which are positioned in intimate contact with or adjacent to heat softenable surfaces which heat softenable surfaces may comprise heat softenable adhesives added to the package or, heat softenable materials of construction of the package per se.

The invention in its broader aspects is accomplished by a method heat sealing a pair of closure elements of a package wherein at least one of the elements of the pair includes a heat softenable material and at least one of the elements of the pair includes magnetic susceptible material which generally comprises subjecting said pair of elements to alternating current whereby the magnetic particles magnetically hold the pair of elements and soften the heat-softenable material.

The invention as set forth hereinabove will be more fully described in reference to the accompanying drawings wherein.

Figure 7:
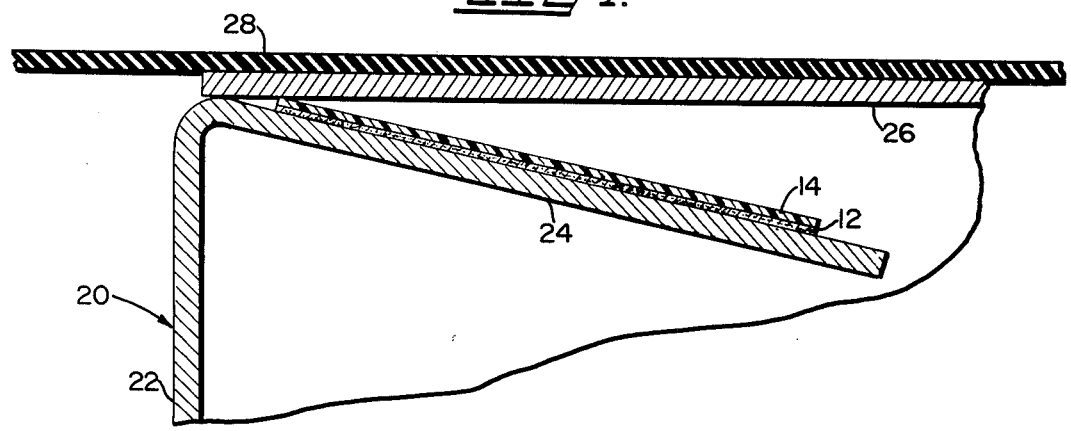
Figure 8:
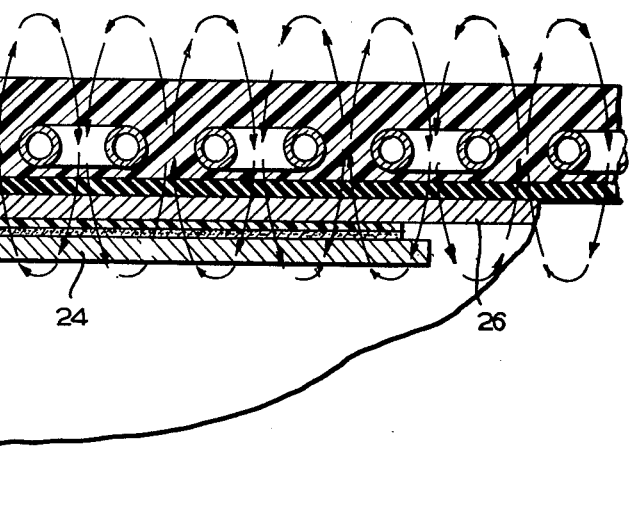
Figure 9:
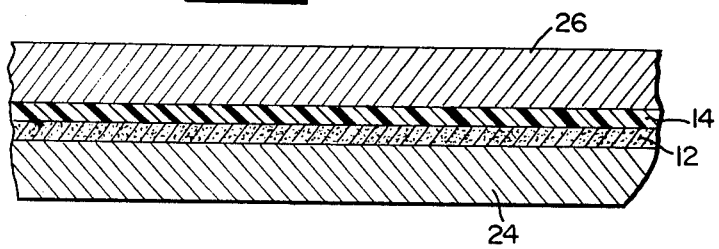
Figure 10:
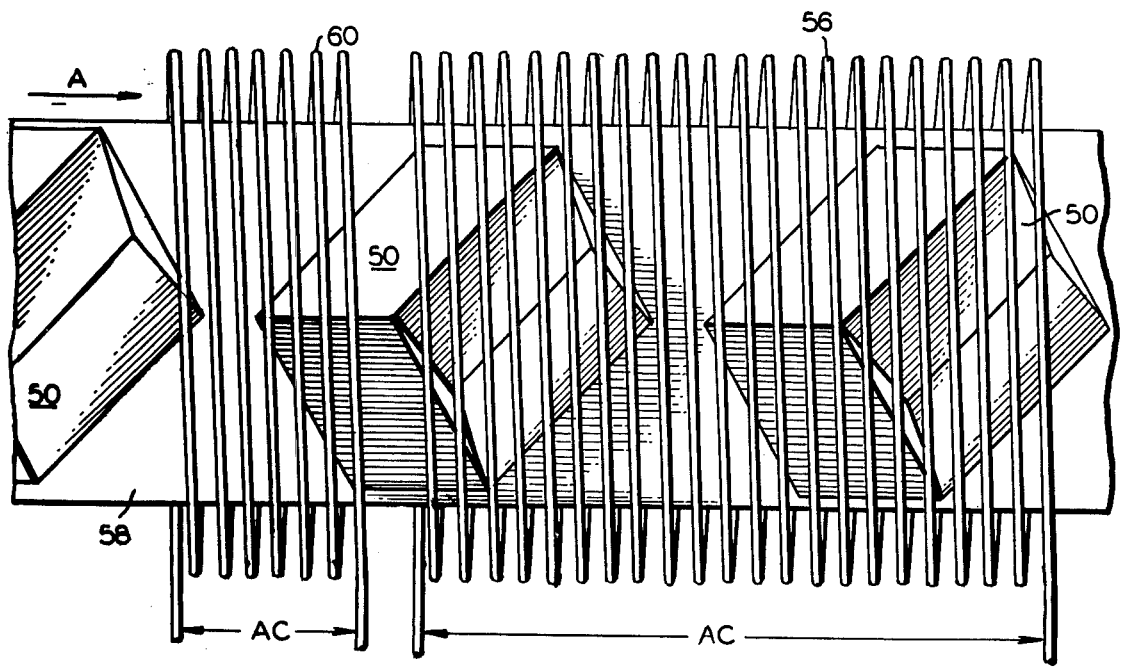
Figure 11:
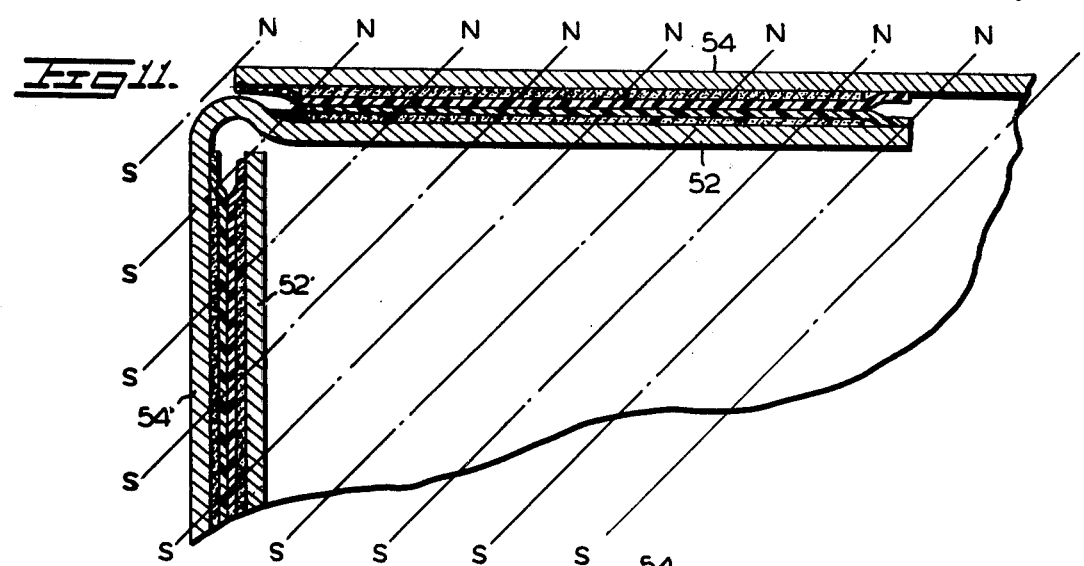
Figure 12:
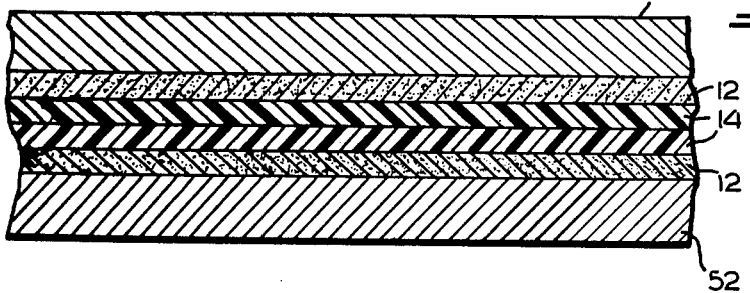

FIG. 7 schematically illustrates a carton, in the unsealed position, which carton embodies structures suitable for carrying out the method of the invention;

FIG. 8 is a view similar to that illustrated in FIG. 7, showing the carton being sealed by apparatus for carrying out the method of the invention;

FIG. 9 is an enlarged fragmentary view of the portion of the sealed container illustrated in FIGS. 7 and 8;

FIG. 10 diagrammatically illustrates sealing apparatus including high frequency alternating current coils and 60 cycle alternating current coils in spaced relationship to a conveyor carrying cartons;

FIG. 11 illustrates the magnetic holding fields created by the coils illustrated in FIG. 10 in relationship to the container;

FIG. 12 illustrates a seal produced with opposed flaps each provided with magnetic susceptible strips and thermoplastic heat-sealing strips;

FIG. 13 schematically illustrates in top elevation a portion of a conveyor system arranged for sealing six faces of a closed container; and FIG. 14 is an elevational view of a portion of the structures shown in FIG. 13.

Basically, in order to carry out the principles of the present invention, there must coexist in adjacent relationship a pair of elements which may comprise bag ends, carton flaps, etc., which pair of elements must include a heat sensitive material and means, which are heatable by high frequency alternating magnetic fields and which are susceptible to the holding force of magnetic flux. As will be more fully appreciated, from the detailed discussion of the invention, the heat sealable material may comprise a thermoplastic resinous or waxy and resinous composition which is applied to one or both of the pair of elements to be sealed or which may be the material of construction of the pair of elements. The magnetic susceptible material may be on only one of the elements, or on both of the flaps whereby a low frequency alternating current such as standard 60 cycle current would induce magnetic fields in the magnetic susceptible particles. The magnetic susceptible particles are also responsive to the high frequency alternating current to generate heat by conventional induction heating means or through hysteresis-loss. The magnetic material may comprise strips or bands of, for example, iron oxide carried by one or both of the surfaces to be sealed by a non-thermoplastic adhesive; the particles may be dispersed in the elements to be sealed during manufacture thereof; or the magnetic susceptible particles may be secured to faces of the elements to be sealed opposite to the opposed sealing surfaces thereof, etc. While there is a wide range of sealing material and the magnetic susceptible holding and heating material, only certain of the forms are specifically illustrated in, for example, FIGS. 1 through 6. It is pointed out, however, that the illustrated forms are for illustration purposes only and are not by way of limitation.

Figure 1:
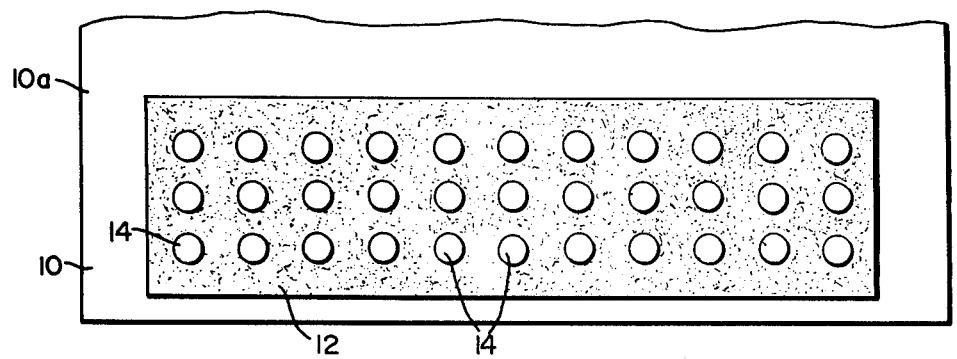
FIG. 1 is a diagrammatic top-plan view of one element of a package to be sealed incorporating structures useful in carrying out the methods of the invention.

Referring to FIG. 1, 10 generally comprises one element of a package adapted to be sealed to another element. The member 10 may comprise a plastic sheet, a pasteboard flap, a foil or combinations thereof. On one surface of the element 10 is secured by a strip or zone of magnetic susceptible material 12. The magnetic susceptible material 12 may comprise fine iron particles, fine magnetic iron oxide, mixtures of iron and magnetic iron oxide, powdered magnetic ceramic material, and the like. The magnetic susceptible particles 12 may be maintained in their illustrated zones and secured to the surface 10a of the element 10 by mixing the particles with a suitable non-thermoplastic adhesive such as, for example, epoxy resins, sodium silicate or polyester adhesives, and the thermosetting resin adhesive such as phenol-formaldehyde urea-formaldehyde and melamine-formaldehyde, and the like.

It will be further appreciated that the magnetic susceptible layer 12 may comprise a film or sheet of non-thermoplastic resinous material having the magnetic susceptible particles embedded or formed therein during sheet formation, or a thin strip or foil of iron or other magnetic material.

Overlaying a portion of the magnetic susceptible layer is the thermoplastic or heat softenable adhesive means 14. In the illustrated form of the invention the heat softenable adhesive 14 is added to the exposed surface of the magnetic susceptible particles in the form of small dots, having appreciable thickness such that when the heat softenable adhesive is softened and then pressed against the other element to which the flap 10 is to be sealed spreading of the adhesive will take place ensuring a substantial seal.

The heat softenable adhesive 14 may comprise substantially any of the synthetic thermoplastic resins, sticky waxes and the like. Particularly good results are obtained with a mixture of polyethylene and a high temperature melting, high gloss wax normally sold under the name of "Elvax;" however, the particular formulation of the heat softenable adhesive would be selected and based on the holding requirements of the package, the price and other conditions of the particular item, to be packaged and its intended use.

Figures 2, 2A:
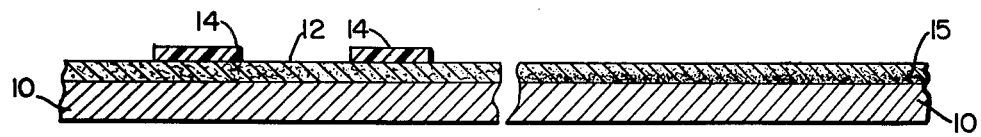
FIG. 2 is an enlarged fragmentary partial sectional view through a portion of the structure illustrated in FIG. 1.
FIG. 2a is an enlarged fragmentary sectional view of a further form of structures incorporating the principles of the present invention.

In FIG. 2a the package element 10 is simultaneously coated with a combination layer 15 and is composed of magnetic susceptible particles, a thermoplastic adhesive composition and a non-thermoplastic adhesive. The layer 15 of FIG. 2a may be prepared as an iron-powder-anchor and thermoplastic overlay ink. The coating may comprise starch paste or sodium silicate coated iron particles in a wet state mixed or emulsified with a naphtha solution of a wax type thermoplastic adhesive such that upon imprinting the composition on a hydrophilic surface the iron particles would be anchored on the top surface of the element 10 and the thermoplastic would flood to and dry on the exposed surface. Separation as set forth above could be assisted by a magnetic field placed below the lower, or uncoated surface of package element 10.

Figure 3:
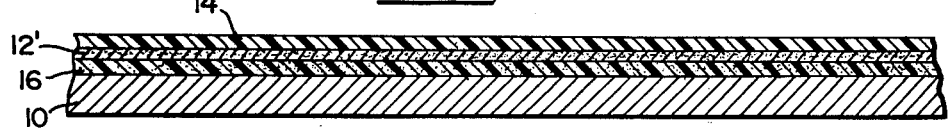
FIG. 3 is an enlarged fragmentary vertical sectional view through a modified package element incorporating the principles of the present invention.

Referring to FIG. 3 of the drawing, the element to be sealed 10 includes a layer of discrete magnetic susceptible particles or film 12', which is secured to the upper surface of the element 10 by a layer of non-thermoplastic adhesive 16. The upper surface of the magnetic susceptible material 12' is provided with a coating of a heat softenable adhesive 14.

Figure 4:
FIG. 4 is an enlarged fragmentary vertical sectional view through a package element illustrating a further modification of the present invention.

Referring specifically to FIG. 4, the element to be sealed 10' has dispersed therein, during its formation or manufacture, particles of magnetic susceptible material 12. This form of this invention has particular utility where the element 10' is made of pasteboard and the magnetic susceptible particles may be mixed with the pasteboard forming fibrous material during the formation step.

The upper surface of the member or element 10' is provided with strips of a film of thermoplastic or other heat softenable material 14.

Figure 5:
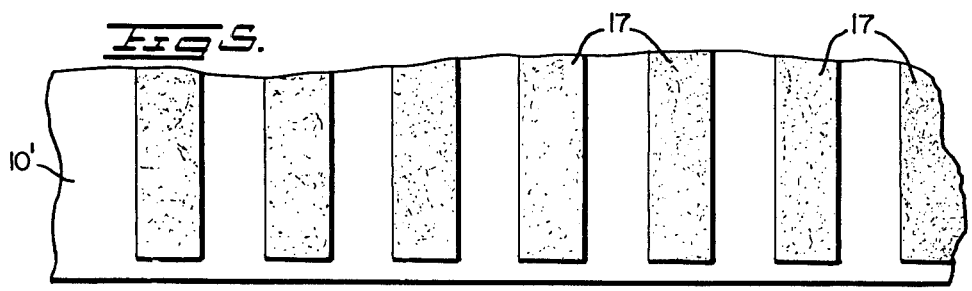
FIG. 5 is a fragmentary top-plan view illustrating a further form of the present invention.

Referring to FIG. 5, a construction is illustrated wherein element 10' is like element 10' of the form of the invention described in reference to FIG. 4, that is, magnetic susceptible particles are dispersed in the element during formation of the element. Further, the heat softenable adhesive 17 has dispersed therein additional particles of magnetic susceptible material which dispersed particles assist in heating the heat softenable material when the material is subjected to high frequency alternating magnetic fields.

Figure 6:
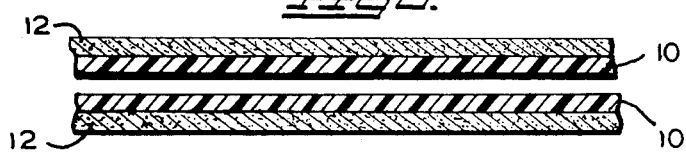
FIG. 6 is an enlarged vertical section through another form of the present invention.

FIG. 6 illustrates a form of the invention which is very suitable for conventional bag packaging. That is, 10 illustrates sheets or films of, for example, polyethelene forming the walls of a bag. The reference 12 designates films or foils of magnetic susceptible material coated or adhered to the outer surfaces of the bag walls in zones adjacent an area to be heat sealed.

Now referring to FIGS. 7, 8 and 9, a carton 20, having a sidewall 22 and a pair of closure flaps 24 and 26 with the flap 24 having attached thereto a magnetic susceptible layer 12 and a heat softenable adhesive layer 14, is placed on a suitable conveyor having a traveling or fixed relatively non-yieldable upper surface 28.

The surface 28, in cooperation with other conveyor structures not shown, moves the carton 20 to the heating and then the holding station which is specifically illustrated in FIG. 8.

The illustrated holding station consists of a hollow coil 30 of a 60 cycle high amperage alternating current energized magnetic field producing unit 32. A cooling or heat exchange fluid is flowed through the coil 30 to prevent over-heating of the unit 32 by the current connected to the ends of the coil, however, the heating effect of the AC current of this frequency is not materially greater than if direct current were employed.

The magnetic field produced in unit 32 acts on magnetic susceptible particles in layer 12 urging the flap 24 into tight engagement with the inner surface of flap 26 so if the heat softenable adhesive composition 14 where in the softened state by having previously passed through an alternating magnetic field produced by passing a high frequency current through a coil similar to coil 30, the pair of flaps 24 and 26 would be intimately connected or sealed.

Since the heating of the heat softenable adhesive composition 14 is by induction via the magnetic susceptible particles 12 in contact with the adhesive there is no large heat sink present and the adhesive is permitted to re-solidify and harden in a very short period. In FIG. 9 a bond between the inner and outer flap 24 and 26 is illustrated in enlarged fragmentary section.

Referring now to FIGS. 10, 11 and 12, another aspect of the invention is illustrated. In FIGS. 10, 11 and 12, all six sides of, for example, a carton 50 may be sealed in a single pass through a high frequency alternating current produced magnetic field and a low frequency alternating current magnetic field. Referring specifically to FIG. 12, an internal carton flap 52 and an external carton flap 54 are illustrated. The opposed faces of the pair of flaps are each provided with a layer of magnetic susceptible particles 12 which are secured to their respective faces of flaps 52 and 54 by suitable non-thermoplastic adhesive means and each flap is provided with an overcoating of a thermoplastic adhesive 14. In FIG. 11 the flaps 52 and 54 and side flaps 52' and 54' are illustrated having superimposed thereon a magnetic field created by 60 cycle alternating current coil 56 which surrounds a conveyor 58 adapted to carry the carton 50 through the sealing zone, the conveyor 58 is adapted to move in the direction of the directional arrow "A." Prior to the entry of cartons 50 into the magnetic field producing and holding zone created by AC energized coil 56, the cartons pass through high frequency AC energized coil 60 wherein the heat softenable composition 14 is heated by heat created in the magnetic susceptible particles, either by high frequency alternating current or by lower frequency alternating current through the medium of hysteresis loss. It will be particularly noted that all of the flaps of the cartons 50 are oriented at an angle to the direction of movement of the conveyor and the coil 56 such that the magnetic field produced by the coil 56 cut at an angle to all of the major flaps of the carton to produce in the magnetic susceptible material north and south poles such that the flaps to be sealed are drawn toward each other and tightly held during the heating and sealing operations. With the cartons 50 supported on the conveyor in the edgewise and canted illustrated manner, the lines of force of the coil produced magnetic fields cut the flaps at a minimum of 35°. The coils 60 and 56, as in the form of the invention illustrated in FIG. 8, are preferably water cooled to remove heat generated in the coils by the flow of the energizing currents. Also in the form of the invention illustrated in FIG. 10, the conveyor 58 and its support, etc., are constructed of non-magnetic susceptible material so that magnetic fields produced by the coils 56 and 60 will not be blocked and so that the alternating magnetic field generated by the coil 60 will not induce heat therein and said heat will only be produced in the magnetic susceptible layers 12 at the exact zones where the heat is necessary to soften the heat softenable heat sealing composition 14.

Referring to FIGS. 13 and 14, there is illustrated apparatus whereby all six sides of a carton may be effectively sealed by the method of the present invention in a twostep procedure. In FIGS. 13 and 14, 60 generally designates a conveyor adapted to transport quadrangular cartons 62 to the first operating zone generally designated 64. The first stage of the apparatus designated 64 consists of four belt conveyor systems designated 66 and 68 which contact the top and bottom of the carton and 70 and 72 which are adapted to contact opposite sides of the carton to be sealed. The inner run of each of the conveyors 66, 68, 70 and 72 run adjacent four alternating current receiving coils 74, 76, 78 and 80, respectively, and adjacent low frequency AC current energized coils 82, 84, 86 and 88, respectively. Thus, it will be seen that as the carton passes the four heat producing coils 74, 76, 78 and 80, the flaps of the carton normal to said coils are heated by heat induced in the magnetic susceptible layers and thereafter the heat softened thermoplastic layers are urged into carton forming and sealing relations by the magnetic field induced in the magnetic susceptible particles by coils 82, 84, 86 and 88. As the cartons 62 are discharged from end 90 of unit 64, the cartons are received on the end of a conveyor 92 of a further unit 94 which is adapted to heat and hold and thus seal the remaining two ends of the carton 62. The heating and holding and thus sealing of the two ends are accomplished by a pair of endless belt conveyors 96 and 98 which contact the initially unsealed ends, a pair of high frequency alternating current energized heat inducing coils 100 and 102, respectively, and a pair of low frequency alternating current magnetic field producing coils 104 and 106, respectively. Thus, as the cartons move from unit 64 onto conveyor belt 92 of unit 94, the heat softenable sealing layers are first softened by induced heat via coils 100 and 102 and then the heat softened thermoplastic layers are pressed into sealing engagement with their associated flaps by magnetic fields radiating from the, for example, 60 cycle current energized coils 104 and 106. The cartons 62, leaving sealing unit 94, pass to a further conveyor 110 which transport the fully sealed cartons to storage or shipping facilities as the case may be.

From the foregoing description of various forms of apparatus and containers which may be sealed by the methods of the process of the present invention, it will be seen by those skilled in the art that the aims and objects hereinbefore set forth are fully accomplished. It will also be appreciated by those skilled in the art that various modifications may be made in the process and in the form of the apparatus for carrying out such process without departing from the scope of the appended claims.

I claim:

1. A method of heat sealing a pair of closure elements of a package wherein at least one of said elements of the pair includes a heat softenable material and at least one of said elements of the pair includes magnetic susceptible material comprising heating said pair of elements to soften the heat softenable material and while softened holding said pair of elements under internal pressure therebetween until the heat softened material has hardened by subjecting said elements to a high frequency alternating current to soften the heat softenable material and low frequency alternating current producing magnetic fields to hold said pair of elements under internal pressure.

2. The invention defined in claim 1 wherein the first of the pair of elements includes magnetic susceptible material and heat softenable material.

3. The invention defined in claim 1 wherein the first of the pair of elements includes magnetic susceptible material and heat softenable material and wherein the second of the pair of elements includes only heat softenable material.

4. The invention defined in claim 1 wherein the first of the pair of elements includes magnetic susceptible material and heat softenable material and wherein the second of the pair of elements includes only magnetic susceptible material.

5. The invention defined in claim 1 wherein each of the pair of elements includes magnetic susceptible material and heat softenable material.

6. The invention defined in claim 1 wherein the low frequency alternating current is 60 cycles per second.

* * * * *